US010283973B2

(12) United States Patent
Curtis (10) Patent No.: US 10,283,973 B2
(45) Date of Patent: May 7, 2019

(54) BALANCED BATTERY CHARGING SYSTEM

(71) Applicant: Microchip Technology Incorporated, Chandler, AZ (US)

(72) Inventor: Keith Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 46 days.

(21) Appl. No.: 15/483,685

(22) Filed: Apr. 10, 2017

(65) Prior Publication Data

US 2017/0294788 A1  Oct. 12, 2017

Related U.S. Application Data

(60) Provisional application No. 62/320,708, filed on Apr. 11, 2016.

(51) Int. Cl.
*H02J 7/00* (2006.01)
*H01M 10/42* (2006.01)
*H01M 10/44* (2006.01)
*H01M 10/48* (2006.01)

(52) U.S. Cl.
CPC ....... *H02J 7/0016* (2013.01); *H01M 10/4207* (2013.01); *H01M 10/441* (2013.01); *H01M 10/482* (2013.01); *H02J 7/007* (2013.01); *H02J 7/0018* (2013.01); *H02J 7/0021* (2013.01); *H02J 7/0055* (2013.01); *H02J 7/0072* (2013.01); *H01M 2010/4271* (2013.01)

(58) Field of Classification Search
CPC ...... H02J 7/0016; H02J 7/0072; H02J 7/0055; H02J 7/0018; H02J 7/0021; H02J 7/007; H01M 10/482; H01M 10/441; H01M 10/4207; H01M 2010/4271

USPC ......................................................... 320/119
See application file for complete search history.

(56) References Cited

U.S. PATENT DOCUMENTS

| 6,008,623 A | 12/1999 | Chen et al. ................... 320/118 |
| 6,009,344 A * | 12/1999 | Flower ..................... A61N 1/30 604/20 |
| 6,172,480 B1 * | 1/2001 | Vandelac .............. H02J 7/0042 320/119 |

(Continued)

FOREIGN PATENT DOCUMENTS

| EP | 2621051 A1 | 7/2013 | ............. G01R 31/36 |
| WO | 2008/137764 A1 | 11/2008 | ............ H01M 10/44 |
| WO | 2013/088695 A2 | 6/2013 | ................ H02J 7/00 |

OTHER PUBLICATIONS

International Search Report and Written Opinion, Application No. PCT/US2017/026971, 12 pages, dated Jul. 12, 2017.

*Primary Examiner* — M Baye Diao
(74) *Attorney, Agent, or Firm* — Slayden Grubert Beard PLLC (57) ABSTRACT

A multi-cell battery pack charging system adjusts each battery cell's charging current to synchronize the completion of charge. The battery pack is charged as a whole, and need only be charged once, and without requiring charge shuttling, resistive charge balancing or inductive charge dumping. Charging current to each battery cell is based on voltage matching of the battery cells being charged, lower voltage battery cells being given more charge current until there is a voltage match to the other series connected battery cells. Additional charge may be given to higher capacity cells of the battery pack during the voltage matching and charging process.

23 Claims, 9 Drawing Sheets

(56) References Cited

U.S. PATENT DOCUMENTS

| | | | | |
|---|---|---|---|---|
| 7,460,930 B1* | 12/2008 | Howell | ................. | G01D 4/002 |
| | | | | 700/295 |
| 7,471,064 B2* | 12/2008 | Sobue | ................... | H02J 7/0026 |
| | | | | 320/116 |
| 8,044,634 B2* | 10/2011 | Hoffman | ................. | F21L 4/085 |
| | | | | 320/110 |
| 8,193,768 B2* | 6/2012 | Hallett | ..................... | G10H 1/32 |
| | | | | 320/108 |
| 8,294,425 B2* | 10/2012 | Aradachi | ............. | H02J 7/0013 |
| | | | | 320/116 |
| 8,436,584 B2* | 5/2013 | Johnson | .................... | B25F 5/00 |
| | | | | 320/132 |
| 8,878,541 B2* | 11/2014 | Nishizawa | ......... | H01M 10/425 |
| | | | | 324/433 |
| 2012/0313584 A1* | 12/2012 | Sugiyama | .............. | B60L 11/14 |
| | | | | 320/119 |
| 2015/0042282 A1* | 2/2015 | Oga | .................... | H01M 10/482 |
| | | | | 320/118 |

* cited by examiner

Figure 6 (Prior Technology)

Figure 7 (Prior Technology)

Figure 8 (Prior Technology)

Figure 9 (Prior Technology)

BALANCED BATTERY CHARGING SYSTEM

RELATED PATENT APPLICATION

This application claims priority to commonly owned U.S. Provisional Patent Application No. 62/320,708; filed Apr. 11, 2016; which is hereby incorporated by reference herein for all purposes.

TECHNICAL FIELD

The present disclosure relates to battery charging systems, and, in particular, to multi-cell battery pack charging systems.

BACKGROUND

Figure 6:
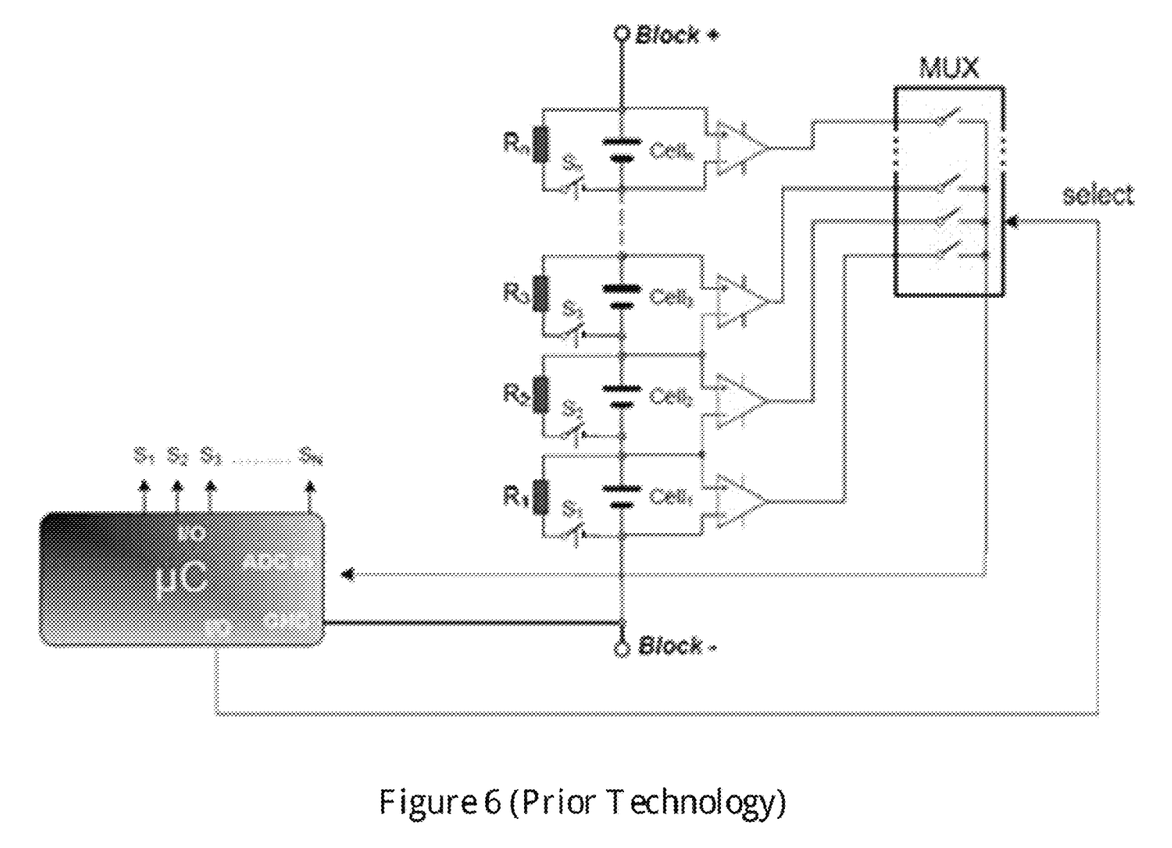
FIG. 6 illustrates a schematic diagram of a resistive charge balancing circuit used for discharging battery cells having a higher voltage until they match the charge voltage of lower voltage battery cells to balance the charge between the battery cells.
Figure 7:
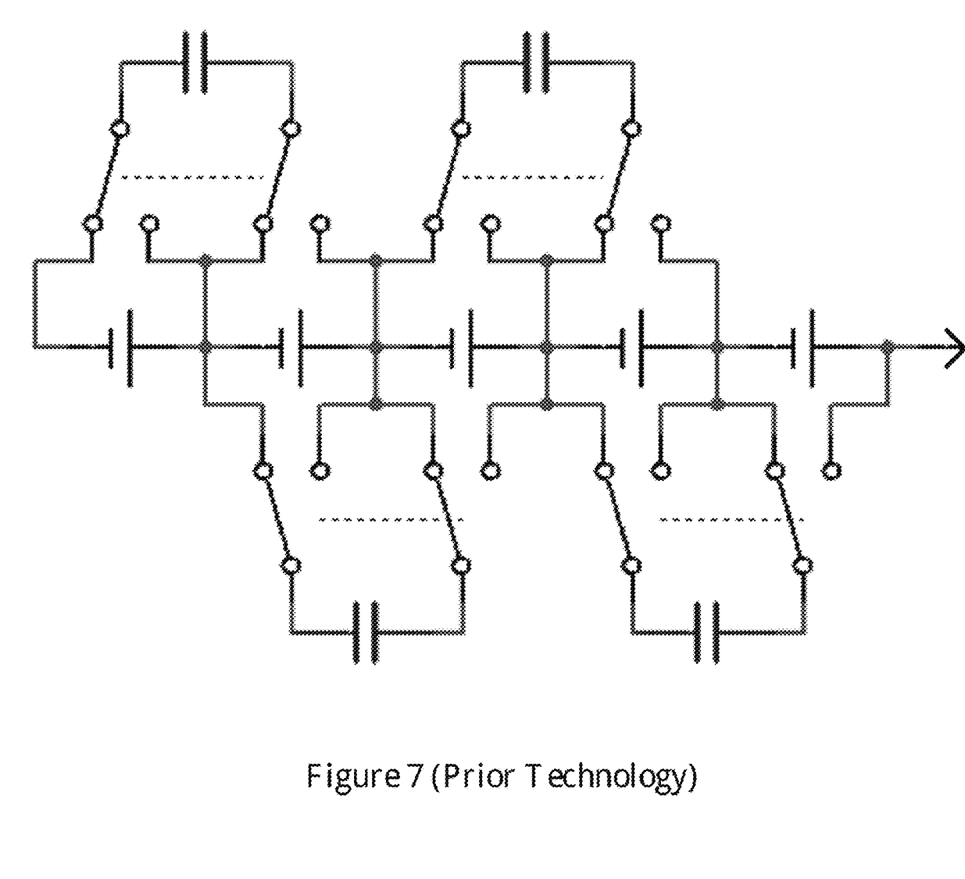
FIG. 7 illustrates a schematic diagram of a capacitive charge shuttling circuit used for moving charge from battery cell(s) having a higher voltage to battery cell(s) having a lower voltage.
Figure 8:
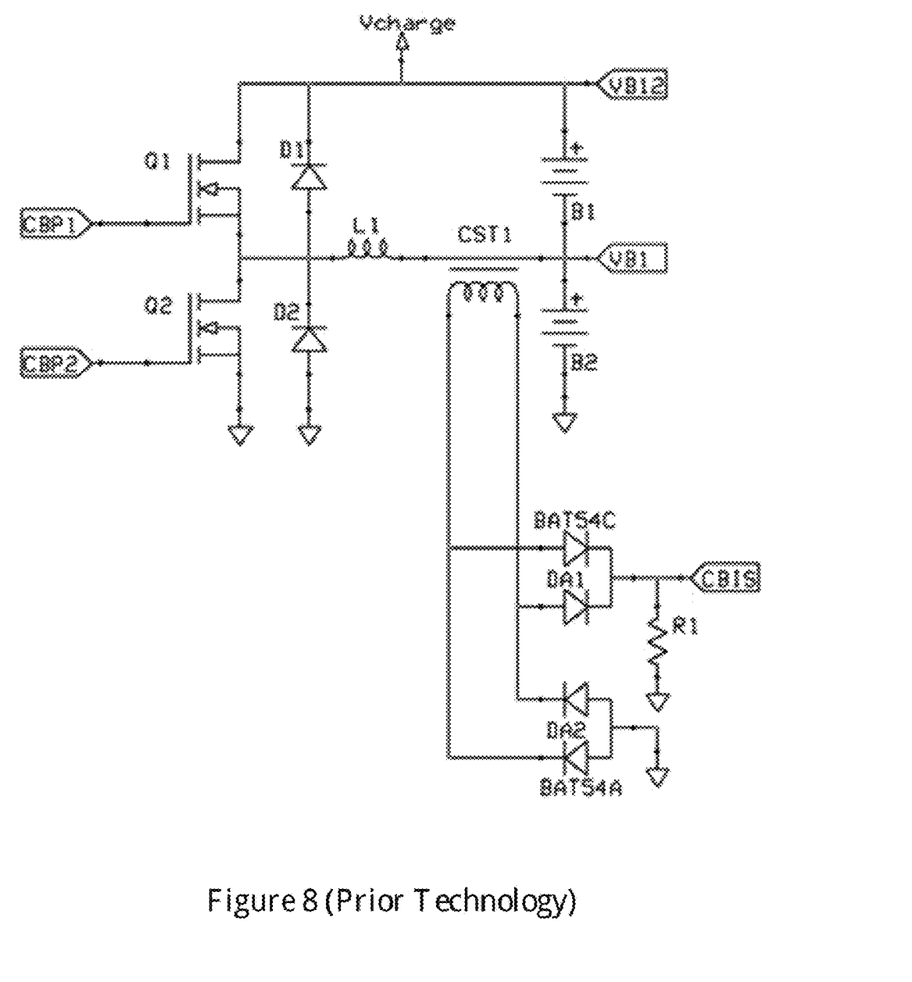
FIG. 8 illustrates a schematic diagram of an inductive charge shuttling circuit used for moving charge from battery cell(s) having a higher voltage to battery cell(s) having a lower voltage.
Figure 9:
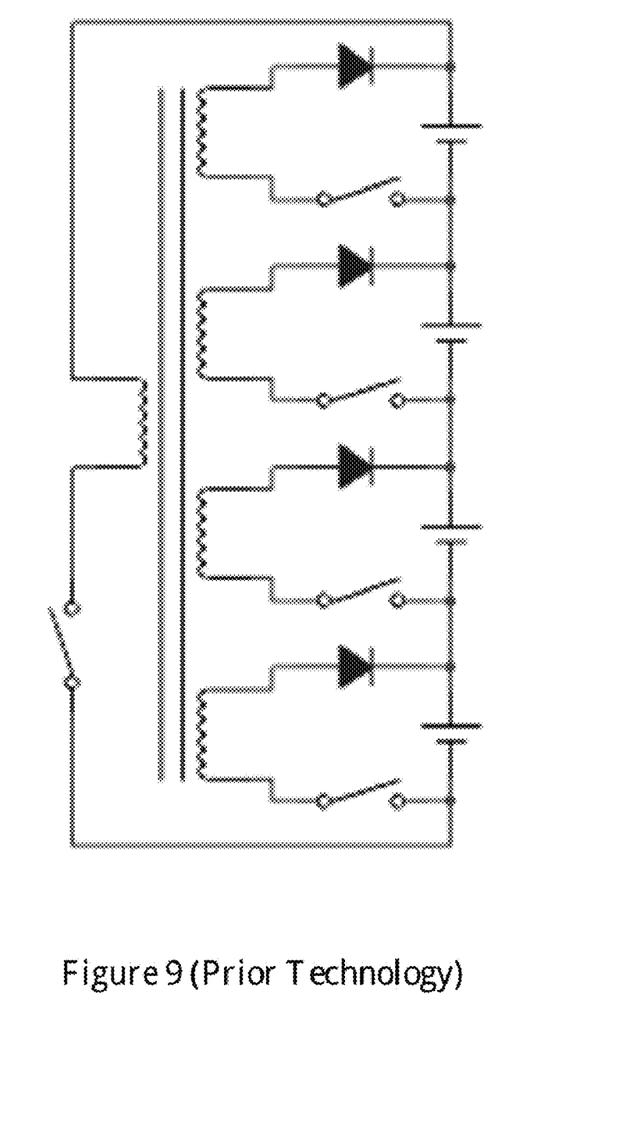
FIG. 9 illustrates a schematic diagram of an inductive switching system that takes charge from higher voltage battery cells and dumps the charge back into the full battery pack.

When charging multi-cell battery packs each battery cell must not be over or under charged. This requires charge balancing of the multi-cell battery pack. There are four different methods for charge balancing of a multi-cell Battery Pack: 1) FIG. 6 shows a resistive charge balancing circuit that is used to discharges cells having a higher voltage until they match the charge voltage of lower voltage cells to balance the charge between the cells. 2) FIG. 7 shows a capacitive charge shuttling circuit used for moving charge from battery cell(s) having a higher voltage to battery cell(s) having a lower voltage. 3) FIG. 8 shows an inductive charge shuttling circuit used for moving charge from battery cell(s) having a higher voltage to battery cell(s) having a lower voltage. And 4) FIG. 9 shows an inductive switching system that takes charge from higher voltage battery cells and dumps the charge back into the full battery pack. Each of these methods removes charge from lower capacity batteries to charge higher capacity cells. The repeated charge/discharge reduces battery life and increases the losses in wasted energy during the battery charging balancing process.

There are two main problems with the aforementioned battery charging methods: One, existing charge balancing methods result in a reduction of charge life typically expected with the individual battery cells. Two, existing charge balancing systems move charge already in a cell, to another cell resulting in losses due to the internal resistance of the cell.

SUMMARY

Hence, there is a need for an improved battery charging system for multi-cell battery packs.

According to an embodiment, a battery charging system for charging a plurality of series connected battery cells in a battery pack may comprise: a first electrical connector adapted for coupling to a second electrical connector of a battery pack, said battery pack may comprise a plurality of battery cells coupled in series, wherein each electrical node of the plurality of battery cells may be coupled to a respective one of a plurality of electrical contacts of the second electrical connector; a first power supply having voltage set-point and a current limit inputs, where plus and minus outputs from the first power supply may be coupled to respective electrical contacts of the first electrical connector that match plus and minus electrical contacts of the second connector that include all of the plurality of battery cells connected in series; a plurality of second power supplies, each having voltage set-point and a current limit inputs, where plus and minus outputs from each of the plurality of second power supplies may be coupled to associated ones of the plurality of battery cells, wherein each one of the plurality of second power supplies can supply charging current to only the one battery cell associated therewith; voltage measurement means configured to measure voltages of each of the plurality of battery cells; and a charge control unit configured to charge the series connected plurality of battery cells with the first power supply and upon detection of a difference between battery cell voltages to individually charge battery cells having a lower voltage than the other battery cells with additional charging current from the associated ones of the plurality of second power supplies, wherein the first power supply charging current may be reduce by the amount of the charging current from the second power supply.

According to a further embodiment, the voltage measurement means may comprise a plurality of analog-to-digital converters (ADCs) coupled to voltage nodes of the series coupled plurality of battery cells. According to a further embodiment, the voltage measurement means may comprise an analog-to-digital converter (ADC) and a multiplexer coupled between the voltage nodes of the series coupled plurality of battery cells and the ADC. According to a further embodiment, the first power supply may be a high current switched-mode power supply, and the plurality of second power supplies may be isolated flyback switched mode power supplies.

According to a further embodiment, a microcontroller may provide: voltage set-point and current limit signals to the first power supply and the plurality of second power supplies; the voltage measurement means for measuring voltage of each of the plurality of battery cells; and a digital processor and memory for running battery charging programs and controlling the first power supply voltage set-point and current limit, and may control the plurality of second power supplies voltage set-points and current limits.

According to a further embodiment, a microcontroller may comprise a communications port coupled to the digital processor for providing battery charging profiles and battery charging status. According to a further embodiment, the plurality of battery cells may be Lithium-ion (Li-Ion) battery cells. According to a further embodiment, the plurality of battery cells may be a plurality of Lithium-ion (Li-ion) battery cells. According to a further embodiment, the plurality of battery cells may be selected from the group consisting of sealed lead acid, NiMh, and NiCad.

According to another embodiment, a battery charging system for charging two series connected battery cells in a battery pack may comprise: a first electrical connector adapted for coupling to a second electrical connector of a battery pack, said battery pack may comprise first and second battery cells coupled in series, wherein each electrical node of the first and second battery cells may be coupled to a respective one of a plurality of electrical contacts of the second electrical connector; a first power supply having a voltage set-point and a current limit inputs, where plus and minus outputs from the first power supply may be coupled to respective electrical contacts of the first electrical connector that match plus and minus electrical contacts of the second connector that include both of the first and second battery cells connected in series; a second power supply having a voltage set-point and a current limit input, where plus and minus outputs from the second power supply may be coupled only to the first battery cell; a third power supply having a voltage set-point and a current limit input, where plus and minus outputs from the third power supply may be coupled only to the second battery cell; voltage measurement means configured to measure voltages of the first and second battery cells; and a charge control unit configured to charge the series connected first and second battery cells with the first power supply and upon detection of a difference between the first and second battery cell voltages to individually charge the battery cell having a lower voltage than the other battery cell with additional charging current from the associated second or third power supply, wherein the first power supply charging current may be reduce by the amount of the charging current from the second or third power supply.

According to a further embodiment, the voltage measurement means may comprise at least two analog-to-digital converters (ADCs) coupled to voltage nodes of the series coupled first and second battery cells. According to a further embodiment, the voltage measurement means may comprise an analog-to-digital converter (ADC) and a multiplexer coupled between the voltage nodes of the series coupled first and second battery cells and the ADC. According to a further embodiment, the first power supply may be a high current switched-mode power supply, and the second and third power supplies may be isolated flyback switched mode power supplies.

According to a further embodiment, a microcontroller may provide: voltage set-point and current limit signals to the first, second and third power supplies; the voltage measurement means for measuring voltages of the first and second battery cells; and a digital processor and memory for running battery charging programs and may control the first, second and third power supply voltage set-points and current limits. According to a further embodiment, a microcontroller may comprise a communications port coupled to the digital processor for providing battery charging profiles and battery charging status.

According to yet another embodiment, a method for charging a battery pack may comprise a plurality of battery cells may comprise the steps of: setting desired voltage set-point and current limit values into a high current power supply for a plurality of series connected battery cells in a battery pack, wherein the high current power supply may provide charging voltage and current to the plurality of series connected battery cells in the battery pack; may determine a voltage of each one of the plurality of series connected battery cells in the battery pack; wherein if any one or more of the battery cells may have a voltage that may not be substantially the same as the other battery cells then if that voltage may be less than the other battery cell voltages then increase current from another power supply coupled to that battery cell and reduce the current limit value of the high current power supply by the value of the current from the another power supply, and if the voltage may be greater than the other battery cells then increase the current to the other battery cells with other associated power supplies coupled to the other ones of the plurality of series connected battery cells, and reduce the current limit value of the high current power supply by the value of the currents from the other associated power supplies.

According to still another embodiment, a method for charging a battery pack may comprise two battery cells, said method may comprise the steps of: setting desired voltage set-point and current limit values into a high current power supply for first and second battery cells in a battery pack and connected series, wherein the first high current power supply provides the desired voltage and current to the first and second series connected battery cells in the battery pack; and determining a first voltage of the first battery cell and a second voltage of the second battery cell; wherein if the first voltage may be greater than the second voltage then increase current from a second power supply coupled to the first battery cell and reduce the current limit value of the high current power supply by the value of the current from the second power supply, and if the first voltage may be less than the second voltage then increase current from a third power supply coupled to the second battery cell and reduce the current limit value of the high current power supply by the value of the current from the third power supply.

According to a further embodiment of the method, the steps of determining the first and second voltages may comprise the steps of: measuring the first voltage across the first battery cell; and measuring the second voltage across the second battery cell. According to a further embodiment of the method, the steps of determining the first and second voltages may comprise the steps of: measuring a voltage across the battery pack; measuring the second voltage across the second battery cell; and subtracting the measured second voltage from the measured voltage across the battery pack to determine the first voltage. According to a further embodiment of the method, the second and third power supplies may provide substantially no currents when the first and second voltages may be substantially equal. According to a further embodiment of the method, the second power supply may provide substantially no current when the first voltage may be greater than the second voltage. According to a further embodiment of the method, the third power supply may provide substantially no current when the first voltage may be less than the second voltage.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

Figure 1:
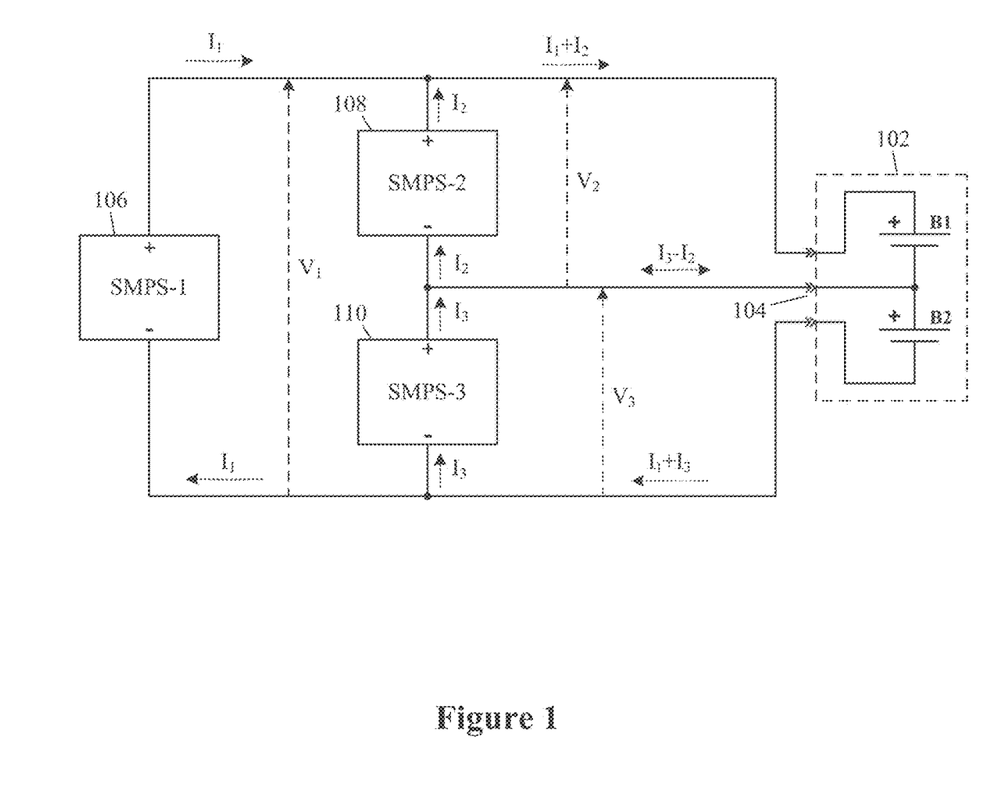
FIG. 1 illustrates a schematic block diagram of a charging system for a multi-cell battery pack showing voltage and current relationships thereof, according to a specific example embodiment of this disclosure.
Figure 2:
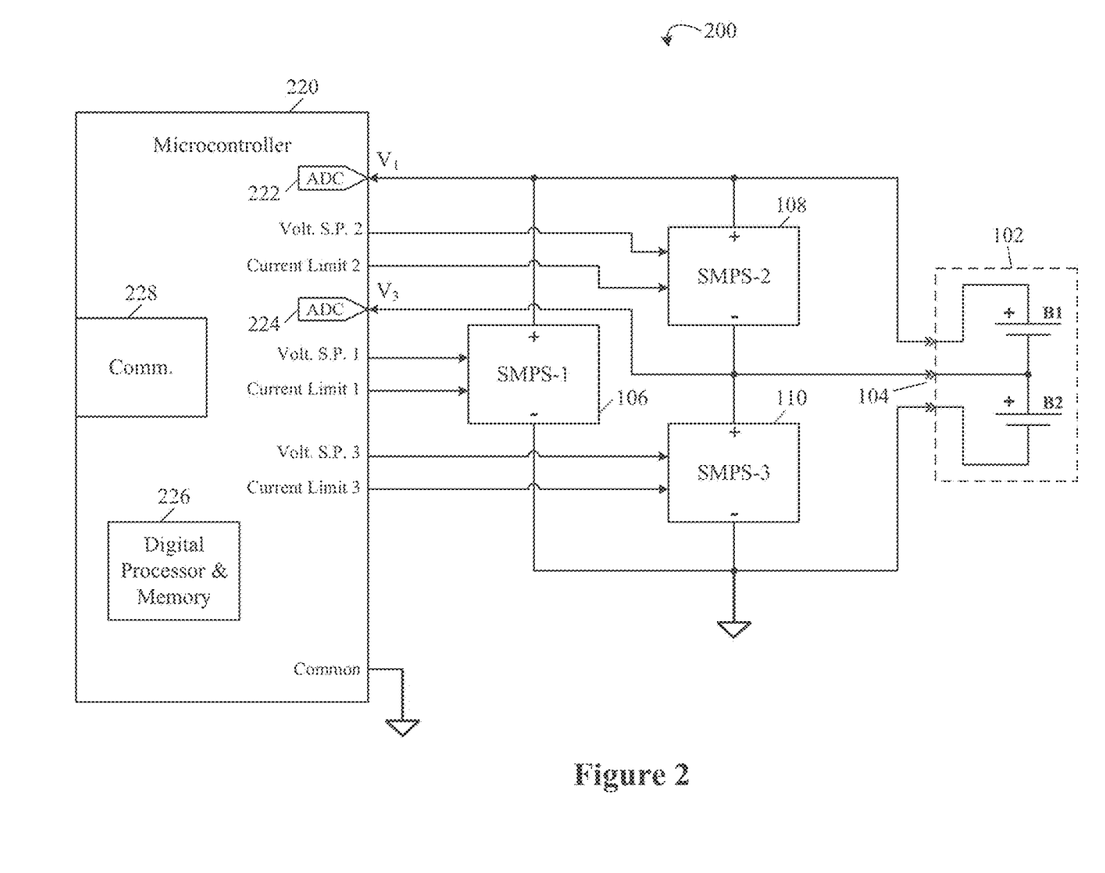
FIG. 2 illustrates a schematic block diagram of a charging system for a battery pack comprising two battery cells, according to a specific example embodiment of this disclosure.

According to various embodiments, a multi-cell battery pack charging system adjusts each battery cell's charging current to synchronize the completion of charge. According to various embodiments, the battery pack is charged as a whole. The battery pack need only be charged once, and without requiring charge shuttling, resistive charge balancing or inductive charge dumping. Charging current to each battery cell is based on voltage matching of the battery cells being charged. Additional charge may be given to higher capacity cells of the battery pack during the voltage matching and charging process. Any battery chemistry requiring charge balancing may be charged according to the teachings of this disclosure, for example, but not limited to, Lithium-ion (Li-ion), sealed lead acid, NiMh, NiCad, etc. FIG. 1 shows a Li-ion battery charging curves. FIG. 2 shows battery capacity depending on the number of charge cycles.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic block diagram of a charging system for a multi-cell battery pack showing voltage and current relationships thereof, according to a specific example embodiment of this disclosure. For descriptive purposes a two-cell battery pack is shown and discussed hereinbelow. It is contemplated and within the scope of this disclosure that a battery pack may comprise more than two battery cells, according to specific embodiments disclosed and claimed herein.

A battery pack 102 may comprise battery cells B1 and B2, and may further comprise an electrical connector 104 coupled to each terminal (node) of the battery cells B1 and B2. A first power supply 106 may be coupled through the electrical connector 104 to a positive terminal of battery cell B1 and a negative terminal of battery cell B2. A second power supply 108 may be coupled through the electrical connector 104 to the positive terminal of battery cell B1 and a negative terminal of battery cell B1. A third power supply 110 may be coupled through the electrical connector 104 to a positive terminal of battery cell B2 and the negative terminal of battery cell B2.

The first power supply 106 may provide a first voltage, $V_1$, and a first current, $I_1$, to the series connected battery cells B1 and B2. The first power supply 106 may have operating voltage and current limit set-point inputs. The second power supply 108 may operate at a second voltage, $V_2$, and provide a second current, $I_2$, to the battery cell B1. The second power supply 108 may have operating voltage and current limit set-point inputs. The third power supply 110 may operate at a third voltage, $V_3$, and provide a third current, $I_3$, to the battery cell B2. The third power supply 110 may have operating voltage and current limit set-point inputs.

The sum of the second voltage, $V_2$, and the third voltage, $V_3$, equal the first voltage, $V_1$. Current relationships for the first, second and third currents, $I_1$, $I_2$ and $I_3$, respectively, are shown in FIG. 1. The second power supply 108 may be a floating power supply, e.g., isolated flyback SMPS. The third power supply 110 may or may not be a floating power supply since its negative (−) or common node is coupled to the negative (−) or common nodes of the first power supply 106 and the battery pack 102. The first power supply 106 may comprise a higher current rated SMPS. The second power supply 108 may comprise an isolated lower current rated SMPS, e.g., an isolated flyback SMPS. The third power supply 110 may comprise a lower current rated SMPS.

When the second voltage, $V_2$, and the third voltage, $V_3$, are substantially equal the second power supply 108 and third power supply 110 do not supply current ($I_2=I_3=0$) and the first power supply 106 alone supplies an optimal charging current $I_1$ to the battery pack 102 at the first voltage, $V_1$. When the second voltage, $V_2$, is less than the third voltage, $V_3$, the first battery cell B1 requires more charge than the second battery cell B2. This is accomplished by the second power supply 108 supplying charging current $I_2$ to only the first battery cell B1. When the second power supply 108 is providing the charging current $I_2$, the first power supply 108 charging current $I_1$ will be reduced by the ampere (milliampere) value of the charging current $I_2$. This maintains the optimal charging current for the battery cell B1. The charging current to the battery cell B2 will be reduced and thereby not charge as fast as will the battery cell B1. These two different battery cell charging currents will be maintained until the second voltage, $V_2$, is again substantially equal to the third voltage, $V_3$. Then the second power supply 108 will cease supplying charging current $I_2$ and the first power supply 106 will go back to supplying the optimal charging current to both battery cells B1 and B2.

In a similar fashion when the second voltage, $V_2$, is greater than the third voltage, $V_3$, the second battery cell B2 requires more charge than the first battery cell B1. This is accomplished by the third power supply 110 supplying charging current $I_3$ to only the second battery cell B2. When the third power supply 110 is providing the charging current $I_3$, the first power supply 108 charging current $I_1$ will be reduced by the ampere (milliampere) value of the charging current $I_3$. This maintains the optimal charging current for the battery cell B2. The charging current to the battery cell B1 will be reduced and thereby not charge as fast as will the battery cell B2. These two different battery cell charging currents will be maintained until the second voltage, $V_2$, is again substantially equal to the third voltage, $V_3$. Then the third power supply 110 will cease supplying charging current $I_3$ and the first power supply 106 will go back to supplying the optimal charging current to both battery cells B1 and B2.

FIG. 2 illustrates a schematic block diagram of a charging system for a battery pack comprising two battery cells, according to a specific example embodiment of this disclosure. A battery pack charging system, generally represented by the numeral 200, may comprise a first power supply 106, a second power supply 108, a third power supply 110 and a microcontroller 220. A battery pack 102 comprising battery cells B1 and B2 may be coupled to the charging system 200 through an electrical connector 104. The first power supply 106 provides charging current and voltage to the series connected battery cells B1 and B2. The second power supply 108 provides charging current and voltage to only battery cell B1 when it is providing current. The third power supply 110 provides charging current and voltage to only battery cell B2 when it is providing current.

At all times the first power supply 106 provides charging current at either the optimum charging current rate for the chemistry of the battery cells B1 and B2, or a reduced charging current when one of the other two power supplies 108 or 110 is supplying charging current to its respective battery cell B1 or B2. The charging current from the first power supply 106 may be reduced by the charging current value provided by power supply 108 or 110. Therefore, the battery cell having the lower voltage will receive full and optimal charging current until its voltage is substantially the same as the other battery cell. While the other battery cell will receive a lower charging current until both battery cells B1 and B2 are at substantially the same voltage. Then whichever power supply 108 or 110 was supplying charging current will turn off and the first power supply 106 will resume supplying full and optimal charging current to both battery cells B1 and B2.

The microcontroller 220 may comprise a digital processor and memory 226, a first analog-to-digital converter (ADC) 222, a second ADC 224, voltage set-point outputs 1, 2 and 3; and current limit outputs 1, 2 and 3. Input power connections are not shown to the microcontroller 220 or power supplies 106, 108 and 110, but one having ordinary skill in the electronic arts and the benefit of this disclosure would understand how to provide the appropriate power connections thereto. The voltage set-points and current limit outputs may be digital (e.g., serial or parallel) and/or analog depending upon the input requirements of the power supplies 106, 108 and 110.

The first power supply 106 may provide most of the charging current to the battery pack 102, and it may be current and voltage limited to provide the necessary current/voltage charging for a specific battery chemistry. Two ADCs 222 and 224 monitor the voltages across the two battery cells B1 and B2 ($V_2=V_1-V_3$) and when a difference between these voltages is detected, the balanced charging system is enabled. Based on the two battery voltages, the current drive of the high current charge from the power supply 106 is reduced, and the appropriate power supply 108 or 110 is enabled at a current output substantially equal to the reduction in the high current charger. In this way, the charging currents for each battery cell may be adjusted to bring the battery cell voltages to be substantially the same. If/when the battery cells B1 and B2 charge to substantially the same voltage, then the power supply 108 or 110 may be shut down and the high current charge from the power supply 106 returns to its normal current limit.

A battery charging program may reside in the memory of the digital processor and memory 226, and run by the processor to control battery charging operations, according to the teachings of this disclosure. In addition, the microcontroller 220 may provide all necessary analog and/or digital outputs to the power supplies, and analog inputs for measuring the battery cell voltages. The battery charging program may provide for charging many different types of battery packs, whose charging profile may be selected through a communications interface 228, e.g., serial, USB, etc.

Figure 3:
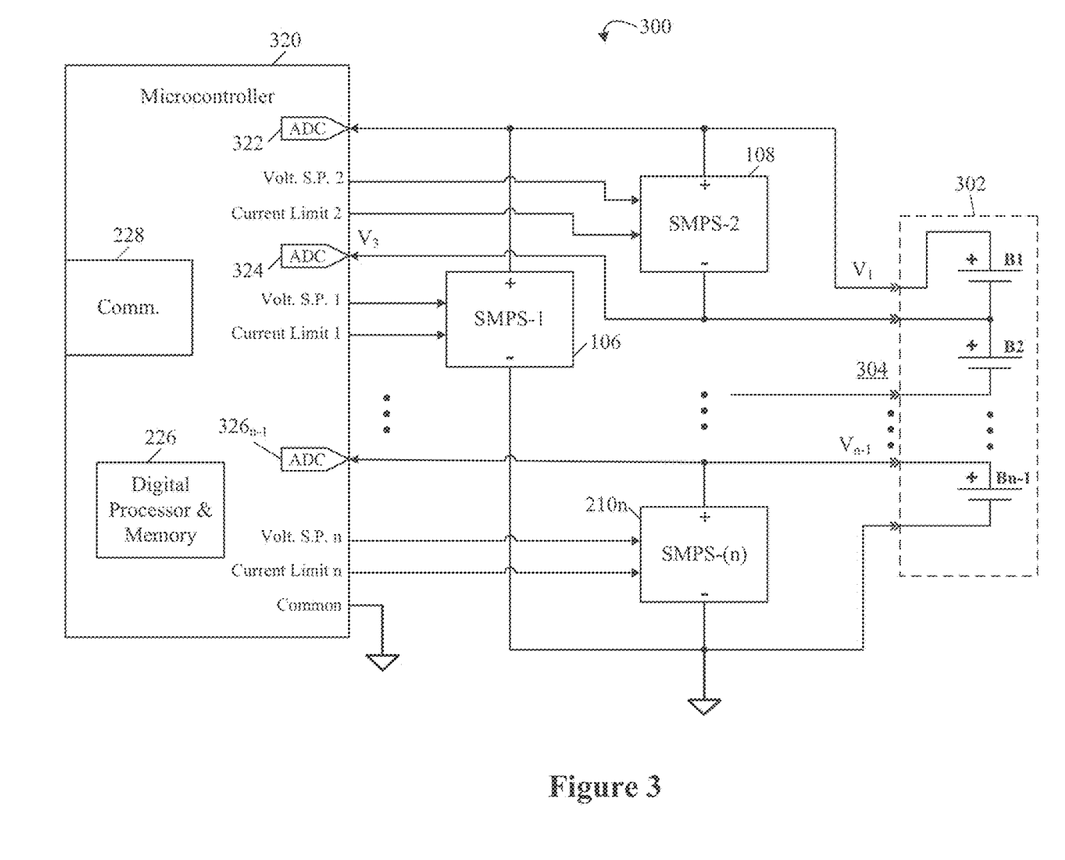
FIG. 3 illustrates a schematic block diagram of a charging system for a battery pack comprising a plurality of battery cells, according to a specific example embodiment of this disclosure.
Figure 4:
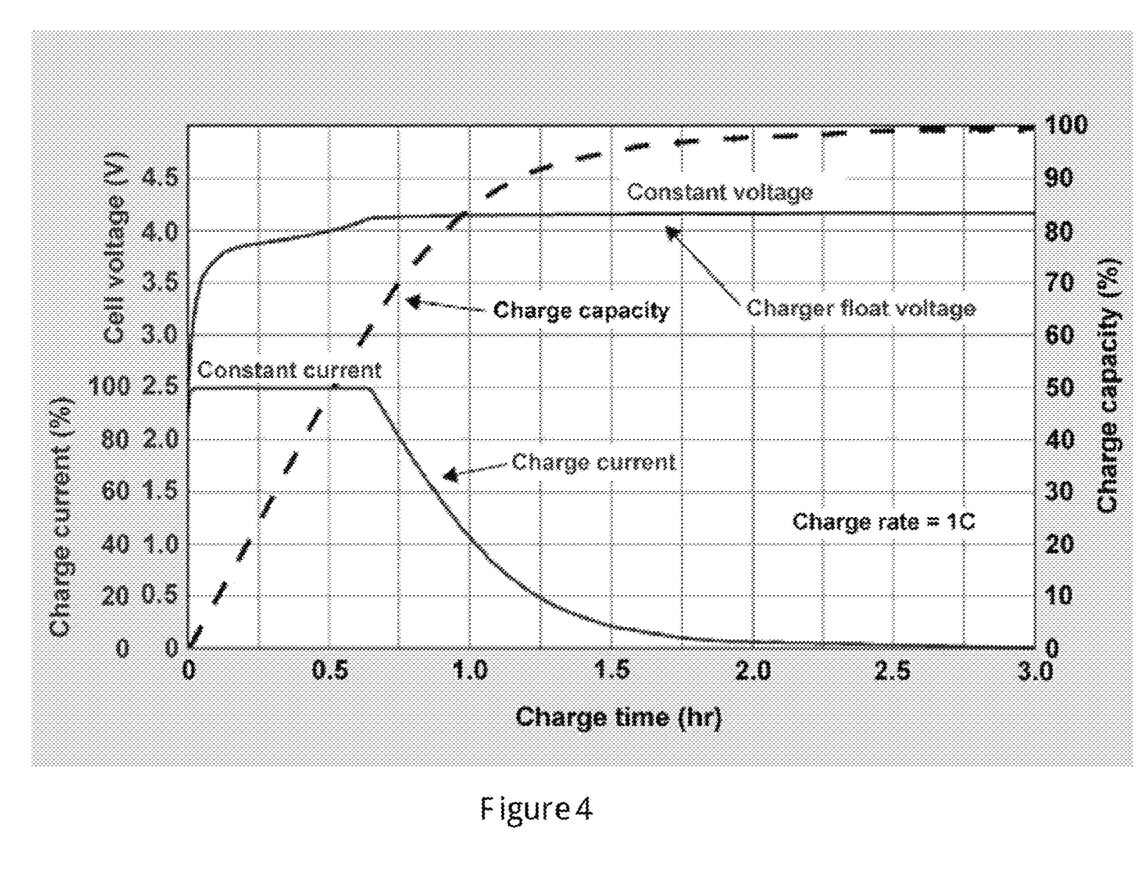
FIG. 4 illustrates a graphical representation of Li-Ion battery charging curves.
Figure 5:
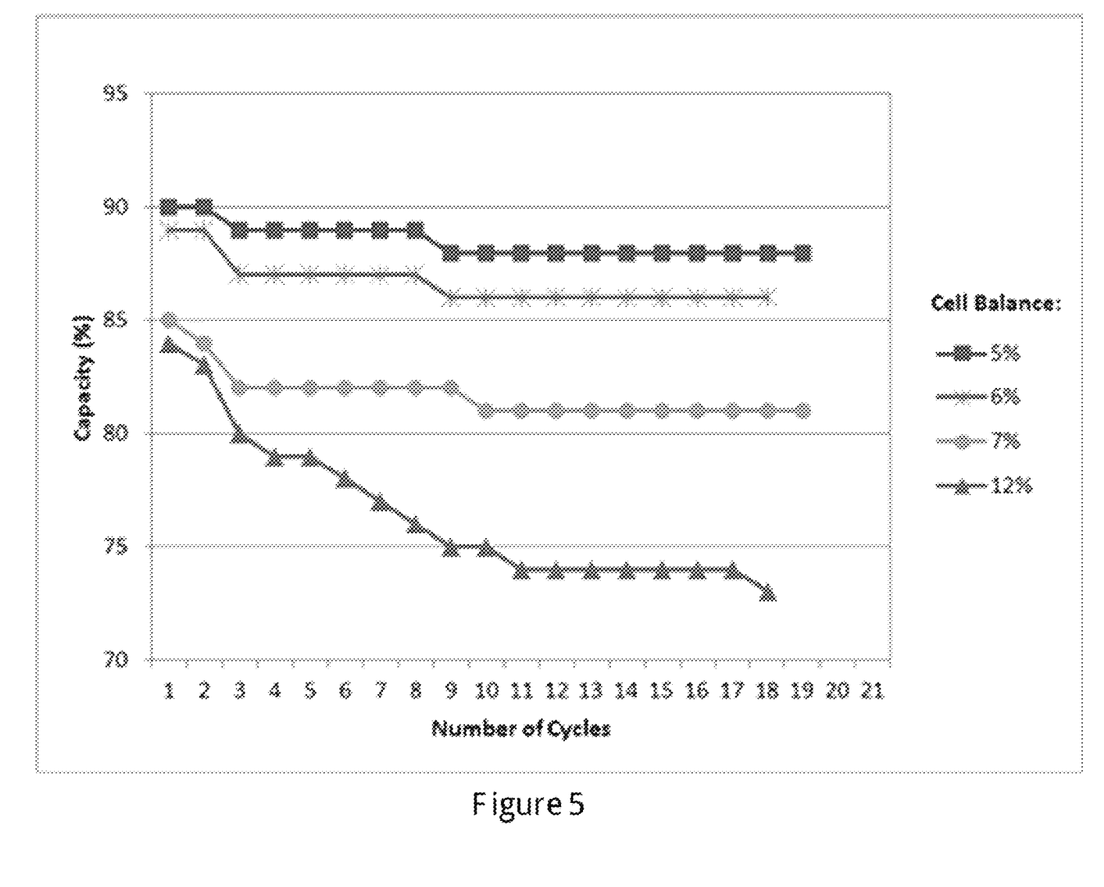
FIG. 5 illustrates a graphical representation of battery capacity resulting from the number of charge cycles.

FIG. 3 illustrates a schematic block diagram of a charging system for a battery pack comprising a plurality of battery cells, according to a specific example embodiment of this disclosure. A battery pack charging system, generally represented by the numeral 300, may comprise a first high current power supply 106, a second lower current power supply 108, a plurality of lower current power supplies 210$n$ and a microcontroller 320. A battery pack 302 may comprise a plurality of battery cells B1 through Bn-1 and may be coupled to the charging system 300 through an electrical connector 304. The first power supply 106 provides charging current and voltage to the series connected battery cells B1 through Bn-1. The second power supply 108 provides charging current and voltage to only battery cell B1 when it is providing current. The plurality of power supplies 210$n$ provide charging current and voltage to an associated battery cell B2 to Bn-1 when it is providing current thereto, where n is the number of battery cells minus 1.

At all times the first power supply 106 provides charging current at either the optimum charging current rate for the chemistry of the battery cells B1 through Bn-1, or a reduced charging current when one or more of the other power supplies 108 or 210$n$ is supplying charging current to its respective battery cell B1 or B2 to Bn-1. The charging current from the first power supply 106 may be reduced by the charging current value provided by power supply 108 and/or 210$n$. Therefore, the battery cell(s) having the lower voltage(s) will receive full and optimal charging current until its (their) voltage(s) is (are) substantially the same as the other battery cells. While the other battery cells will receive a lower charging current until all battery cells B1 through Bn-1 are at substantially the same voltage. Then whichever power supply(ies) 108 or 210$n$ was (were) supplying charging current will turn off and the first power supply 106 will resume supplying full and optimal charging current to the battery cells B1 through Bn-1. More than one lower current power supply may be supplying current to its associated battery cell when those battery cells have a lower voltage then some other ones of the plurality of battery cells.

The microcontroller 320 may comprise a digital processor and memory 226, a first analog-to-digital converter (ADC) 322, a second ADC 324, a plurality of ADCs 326$6n$-1, voltage set-point outputs 1 through n, and current limit outputs 1 through n. Input power connections are not shown to the microcontroller 320 or power supplies 106, 108 and the plurality of power supplies 210$n$, but one having ordinary skill in the electronic arts and the benefit of this disclosure would understand how to provide the appropriate power connections thereto. The voltage set-points and current limit outputs may be digital (e.g., serial or parallel) and/or analog depending upon the input requirements of the power supplies 106, 108 and the plurality of power supplies 210$n$. A single ADC and sample and hold multiplexer (not shown) may be used instead of a plurality of ADCs.

The first power supply 106 may provide most of the charging current to the battery pack 302, it may be current and voltage limited to provide the necessary current/voltage charging for a specific battery chemistry. ADCs 322, 324 and a plurality of ADCs 326$n$-1 monitor the voltages across the battery cells B1 through Bn-1, and when a difference between these voltages is detected, the balanced charging system is enabled. Based on the difference in individual battery cell voltages, the current drive of the high current charge from the power supply 106 is reduced, and the appropriate power supply(ies) 108 and/or 210$n$ may be enabled at a current output substantially equal to the reduction in the high current charger. In this way, the charging currents for each battery cell may be adjusted to bring the battery cell voltages to be substantially the same. If/when the battery cells charge to substantially the same voltage, then the power supply 108 or 110 may be shut down and the high current charge from the power supply 106 returns to its normal current limit.

A battery charging program may reside in the memory of the digital processor and memory 226, and run by the processor thereof to control battery charging operations, according to the teachings of this disclosure. In addition, the microcontroller 320 may provide all necessary analog and/or digital outputs to the power supplies, and analog inputs for measuring the battery cell voltages. The battery charging program may provide for charging many different types of battery packs, whose charging profile may be selected through a communications interface 228, e.g., serial, USB, etc.

In the embodiments disclosed and claimed herein, each battery cell is charged once and the battery life is thereby maximized. Each battery cell is fully charged and no battery cell is over charged in the battery pack, whereby the charge time is optimized. Because charge current is never removed from a battery, the losses in battery life and heating due to repetitive charge and discharge of prior technology charge balancing systems are avoided.

Conventional prior technology charge balancing systems are designed to operate outside the normal charging algorithms used to charge multi-cell battery packs. Only the use of an intelligent charger as provided by the various embodiments disclosed and claimed herein and having the ability to adaptively charge individual battery cells would be able to implement a battery charging system that does not suffer from the deficiencies of the prior technology multi-cell battery pack charging systems.

The voltage difference is charge and chemistry dependent. So, when one battery is low in voltage, then the amount of current would be added to just that battery and may be determined by the charge curves for that battery chemistry. This is just a starting point though, the system can keep track of the voltage increase during charging and if it remained low, then the current to the low cell could be increased. How much and how long would depend upon the chemistry, capacity of the cell, and probably temperature.

The invention claimed is:

1. A battery charging system for charging a plurality of series connected battery cells in a battery pack, said system comprising:
a first electrical connector adapted for coupling to a second electrical connector of a battery pack, said battery pack comprising a plurality of battery cells coupled in series, wherein each electrical node of the plurality of battery cells is coupled to a respective one of a plurality of electrical contacts of the second electrical connector;
a first power supply having voltage set-point and a current limit input, where plus and minus outputs from the first power supply are coupled to respective electrical contacts of the first electrical connector that match plus and minus electrical contacts of the second connector that include all of the plurality of battery cells connected in series;
a plurality of second power supplies, each having voltage set-point and a current limit input, where plus and minus outputs from each of the plurality of second power supplies is coupled to associated ones of the plurality of battery cells, wherein each one of the plurality of second power supplies can supply charging current to only the one battery cell associated therewith;
voltage measurement means configured to measure voltages of each of the plurality of battery cells; and
a charge control unit configured to charge the series connected plurality of battery cells with the first power supply and upon detection of a difference between battery cell voltages to individually charge battery cells having a lower voltage than the other battery cells with additional charging current from the associated ones of the plurality of second power supplies, wherein the first power supply charging current is reduced by the amount of the charging current from the second power supply.

2. The battery charging system according to claim 1, wherein the voltage measurement means comprises a plurality of analog-to-digital converters (DACs) coupled to voltage nodes of the series coupled plurality of battery cells.

3. The battery charging system according to claim 1, wherein the voltage measurement means comprises an analog-to-digital converter (ADC) and a multiplexer coupled between the voltage nodes of the series coupled plurality of battery cells and the ADC.

4. The battery charging system according to claim 1, wherein the first power supply is a high current switched-mode power supply, and the plurality of second power supplies are isolated flyback switched mode power supplies.

5. The battery charging system according to claim 1, wherein a microcontroller provides:
voltage set-point and current limit signals to the first power supply and the plurality of second power supplies;
the voltage measurement means for measuring voltage of each of the plurality of battery cells; and
a digital processor and memory for running battery charging programs and controlling the first power supply voltage set-point and current limit, and controlling the plurality of second power supplies voltage set-points and current limits.

6. The battery charging system according to claim 5, further comprising a microcontroller communications port coupled to the digital processor for providing battery charging profiles and battery charging status.

7. The battery charging system according to claim 1, wherein the plurality of battery cells are Lithium-ion (Li-Ion) battery cells.

8. The battery charging system according to claim 1, wherein the plurality of battery cells are a plurality of Lithium-ion (Li-ion) battery cells.

9. The battery charging system according to claim 1, wherein the plurality of battery cells are selected from the group consisting of sealed lead acid, NiMh, and NiCad.

10. A battery charging system for charging two series connected battery cells in a battery pack, said system comprising:
a first electrical connector adapted for coupling to a second electrical connector of a battery pack, said battery pack comprising first and second battery cells coupled in series, wherein each electrical node of the first and second battery cells is coupled to a respective one of a plurality of electrical contacts of the second electrical connector;
a first power supply having a voltage set-point and a current limit input, where plus and minus outputs from the first power supply are coupled to respective electrical contacts of the first electrical connector that match plus and minus electrical contacts of the second connector that include both of the first and second battery cells connected in series;
a second power supply having a voltage set-point and a current limit input, where plus and minus outputs from the second power supply are coupled only to the first battery cell;

a third power supply having a voltage set-point and a current limit input, where plus and minus outputs from the third power supply are coupled only to the second battery cell;

voltage measurement means configured to measure voltages of the first and second battery cells; and a charge control unit configured to charge the series connected first and second battery cells with the first power supply and upon detection of a difference between the first and second battery cell voltages to individually charge the battery cell having a lower voltage than the other battery cell with additional charging current from the associated second or third power supply, wherein the first power supply charging current is reduced by the amount of the charging current from the second or third power supply.

11. The battery charging system according to claim 10, wherein the voltage measurement means comprises at least two analog-to-digital converters (DACs) coupled to voltage nodes of the series coupled first and second battery cells.

12. The battery charging system according to claim 10, wherein the voltage measurement means comprises an analog-to-digital converter (ADC) and a multiplexer coupled between the voltage nodes of the series coupled first and second battery cells and the ADC.

13. The battery charging system according to claim 10, wherein the first power supply is a high current switched-mode power supply, and the second and third power supplies are isolated flyback switched mode power supplies.

14. The battery charging system according to claim 10, wherein a microcontroller provides:

voltage set-point and current limit signals to the first, second and third power supplies;

the voltage measurement means for measuring voltages of the first and second battery cells; and a digital processor and memory for running battery charging programs and controlling the first, second and third power supply voltage set-points and current limits.

15. The battery charging system according to claim 14, further comprising a microcontroller communications port coupled to the digital processor for providing battery charging profiles and battery charging status.

16. A method for charging a battery pack comprising a plurality of battery cells, said method comprising the steps of:

providing a first electrical connector adapted for coupling to a second electrical connector of the battery pack, said battery pack comprising a plurality of battery cells coupled in series, wherein each electrical node of the plurality of battery cells is coupled to a respective one of a plurality of electrical contacts of the second electrical connector;

providing a first power supply having voltage set-point and a current limit input, where plus and minus outputs from the first power supply are coupled to respective electrical contacts of the first electrical connector that match plus and minus electrical contacts of the second connector that include all of the plurality of battery cells connected in series;

providing a plurality of second power supplies, each having voltage set-point and a current limit input, where plus and minus outputs from each of the plurality of second power supplies is coupled to associated ones of the plurality of battery cells, wherein each one of the plurality of second power supplies can supply charging current to only the one battery cell associated therewith;

setting desired voltage set-point and current limit values into the first power supply for the plurality of series connected battery cells in the battery pack, wherein the first power supply provides charging voltage and current to the plurality of series connected battery cells in the battery pack;

determining a voltage of each one of the plurality of series connected battery cells in the battery pack;

wherein if any one or more of the battery cells has a voltage that is not substantially the same as the other battery cells then if that voltage is less than the other battery cell voltages then control a charge control unit to increase current from one of the second power supplies coupled to that battery cell and to reduce the current limit value of the first power supply by the value of the current from the one of the second power supplies, and if the voltage is greater than the other battery cells then control the charge control unit to increase the current to the other battery cells with other associated power supplies from said plurality of second power supplies coupled to the other ones of the plurality of series connected battery cells, and to reduce the current limit value of the first power supply by the value of the currents from the other associated power supplies.

17. A method for charging a battery pack comprising two battery cells, said method comprising the steps of:

providing a first electrical connector adapted for coupling to a second electrical connector of a battery pack, said battery pack comprising first and second battery cells coupled in series, wherein each electrical node of the first and second battery cells is coupled to a respective one of a plurality of electrical contacts of the second electrical connector;

providing a first power supply having a voltage set-point and a current limit input, where plus and minus outputs from the first power supply are coupled to respective electrical contacts of the first electrical connector that match plus and minus electrical contacts of the second connector that include both of the first and second battery cells connected in series;

providing a second power supply having a voltage set-point and a current limit input, where plus and minus outputs from the second power supply are coupled only to the first battery cell;

providing a third power supply having a voltage set-point and a current limit input, where plus and minus outputs from the third power supply are coupled only to the second battery cell;

setting desired voltage set-point and current limit values into the first power supply for the first and second battery cells in the battery pack, wherein the first power supply provides the desired voltage and current to the first and second series connected battery cells in the battery pack; and determining a first voltage of the first battery cell and a second voltage of the second battery cell by a voltage measurement unit;

wherein if the first voltage is greater than the second voltage then control a charge control unit to increase current from a second power supply coupled to the first battery cell and to reduce the current limit value of the high current power supply by the value of the current from the second power supply, and if the first voltage is less than the second voltage then control the charge control unit to increase current from a third power supply coupled to the second battery cell and to reduce the current limit value of the high current power supply by the value of the current from the third power supply.

18. The method according to claim 17, wherein the steps of determining the first and second voltages comprise the steps of:
measuring the first voltage across the first battery cell by a first analog-to-digital converter (ADC); and
measuring the second voltage across the second battery cell by a second ADC.

19. The method according to claim 17, wherein the steps of determining the first and second voltages comprise the steps of:
measuring a voltage across the battery pack by a first analog-to-digital converter (ADC);
measuring the second voltage across the second battery cell by a second ADC; and
subtracting the measured second voltage from the measured voltage across the battery pack to determine the first voltage.

20. The method according to claim 17, wherein the second and third power supplies provide substantially no currents when the first and second voltages are substantially equal.

21. The method according to claim 17, wherein the second power supply provides substantially no current when the first voltage is greater than the second voltage.

22. The method according to claim 17, wherein the third power supply provides substantially no current when the first voltage is less than the second voltage.

23. The method according to claim 18, wherein the first and second ADC are formed by a multiplexer and a common ADC.

* * * * *

UNITED STATES PATENT AND TRADEMARK OFFICE
CERTIFICATE OF CORRECTION

PATENT NO. : 10,283,973 B2  
APPLICATION NO. : 15/483685  
DATED : May 7, 2019  
INVENTOR(S) : Keith Curtis

Page 1 of 1

It is certified that error appears in the above-identified patent and that said Letters Patent is hereby corrected as shown below:

In the Specification

Column 8,
Detailed Description, Line 36, "...322, a second ADC 324, a plurality of ADSs $3266n\text{-}1$,..."
---Change to--- "...322, a second ADC 324, a plurality of ADSs $326n\text{-}1$..."

Signed and Sealed this
Twenty-fifth Day of June, 2019

Andrei Iancu
*Director of the United States Patent and Trademark Office*